Feb. 13, 1940.   F. A. HARRIS   2,190,316
ADJUSTABLE SKATE
Filed Jan. 24, 1938   8 Sheets-Sheet 1

INVENTOR.
Fredric A. Harris
BY M. Talbert Dick
ATTORNEY.

Feb. 13, 1940.　　F. A. HARRIS　　2,190,316
ADJUSTABLE SKATE
Filed Jan. 24, 1938　　8 Sheets-Sheet 2

INVENTOR.
Fredric A. Harris
BY M. Talbert Dick
ATTORNEY.

Feb. 13, 1940.　　　F. A. HARRIS　　　2,190,316
ADJUSTABLE SKATE
Filed Jan. 24, 1938　　　8 Sheets-Sheet 3

INVENTOR.
Fredric A. Harris
BY M. Talbert Dick
ATTORNEY.

Feb. 13, 1940.         F. A. HARRIS         2,190,316
ADJUSTABLE SKATE
Filed Jan. 24, 1938         8 Sheets-Sheet 4

INVENTOR.
Fredric A. Harris
BY M. Talbert Dick
ATTORNEY.

Feb. 13, 1940. F. A. HARRIS 2,190,316
ADJUSTABLE SKATE
Filed Jan. 24, 1938 8 Sheets-Sheet 5

INVENTOR.
Fredric A. Harris
BY M. Talbert Dick
ATTORNEY

Feb. 13, 1940.  F. A. HARRIS  2,190,316
ADJUSTABLE SKATE
Filed Jan. 24, 1938   8 Sheets-Sheet 6

INVENTOR.
Fredric A. Harris
BY M. Talbert Dick
ATTORNEY.

Feb. 13, 1940.  F. A. HARRIS  2,190,316
ADJUSTABLE SKATE
Filed Jan. 24, 1938  8 Sheets-Sheet 7

INVENTOR.
Fredric A. Harris
BY M. Talbert Dick
ATTORNEY

UNITED STATES PATENT OFFICE 2,190,316

ADJUSTABLE SKATE

Fredric A. Harris, Des Moines, Iowa

Application January 24, 1938, Serial No. 186,589

4 Claims. (Cl. 280—11.26)

The principal object of my invention is to provide a skate that is capable of great flexibility from the standpoint of assembly, adjustment and relative positioning of its various component parts.

More specifically, the object of this invention is to provide a skate composed of a plurality of co-operative units that are capable of being quickly and easily adjusted to meet the demands of any skating condition or situation and also that may be easily and quickly adjusted to fit the shoes of the user.

A still further object of this invention is to provide a skate having a single elongated base chassis upon which all of the various other parts of the skate are slidably supported and secured.

A still further object of my invention is to provide a skate capable of employing a plurality of wheels which may be adjustably arranged into various combinations and positions relative to themselves and the skate platform.

A still further object of my invention is to provide a skate that has substantially its entire component units stamped from sheet material and one that may be assembled or adjusted by the use of a single wrench.

A still further object of this invention is to provide a skate having readily interchangeable parts and which can be used either by experts or unskilled persons being readily adaptable to all types of wheeled or runner variations.

A still further object of my invention is to provide a skate whereby any number of attachments may be purchased separately by the user in order to convert the skate to fit the user's own particular needs.

A still further object of my invention is to provide a skate that is economical in manufacture, durable in use, efficient and refined in appearance.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

The use of skates in both roller and blade types is very old. The chief objections to skates heretofore offered to the public are that they are greatly limited from an adjustment standpoint and what little adjustment they do have is relative to the width of the shoe of the user. This means that there must be a separate pair of skates for substantially each shoe length. In the wheel skate, there is no means of adjustably allocating the positions of the wheels. Furthermore, an individual cannot use roller skates on ice, nor can one use the blade or ice skates on pavements or floors. Because of this, each individual must have a pair of skates for pavement and like and another pair of skates for ice and if such individual is a child, it is necessary to get new skates to fit the growing lengths of his or her feet.

I have overcome such objections by providing a skate that may be easily and quickly changed for either ice or pavement usage and may also be easily and quickly adjusted to fit various lengths of shoes. My skate also permits universal adjustment and positioning of the wheel assemblies.

Figure 1:
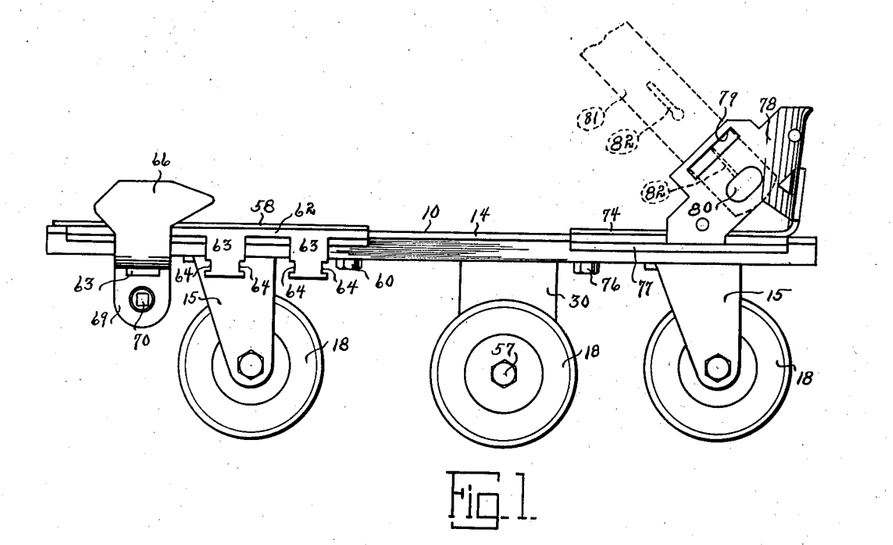
Fig. 1 is a side plan view of my complete skate showing one of the wheel arrangements.
Figure 8:
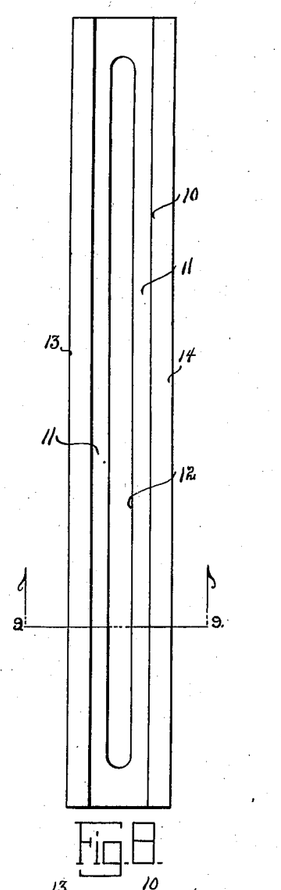
Fig. 8 is an enlarged top plan view of the frame or chassis bar of my skate.
Figure 9:
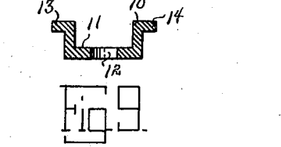
Fig. 9 is an enlarged end sectional view of the chassis bar taken on the line 9—9 of Fig. 8.
Figure 19:
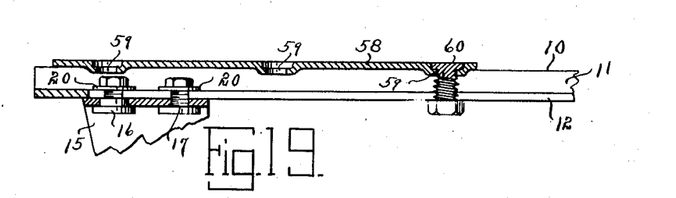
Fig. 19 is an enlarged side sectional view of the toe plate and a portion of the chassis bar showing the method of securing the toe plate in place relative to the chassis bar.

Referring to the drawings, I have used the numeral 10 to designate the chassis bar. It will hereafter be noted that all parts of my skate are slidably adjustably secured to this bar 10. Although different lengthed chassis bars may be used, it is obvious that one length of chassis bar will take care of a great number of shoe sizes. The numeral 11 designates a centrally located longitudinal groove in the top of the bar 10 and extending its entire length. The numeral 12 designates an elongated slot opening in the bottom center of the groove 11 as shown in Fig. 8. The numerals 13 and 14 designate the two outwardly extending flange edges on the two sides respectively of the bar 10 as shown in Fig. 9. The slot opening 12 extends to points near the two ends of the bar 10. The numeral 15 designates two wheel forks. The numerals 16 and 17 designate two ordinary bolts extending through the upper portion of the fork 15 through the slot opening 12 and with their nuts within the groove 11 as shown in Fig. 19. The numeral 18 designates a wheel rotatably mounted in each of the forks 15. Obviously, with the nuts of the bolts 16 and 17 in a loosened condition, the forks 15 carrying the wheels 18 may be slid forwardly and backwardly on the bar 10. When the proper desired position of these forks and wheels are obtained, the bolts 16 and 17 are tightened, thereby rigidly securing the forks to the under side of the bar 10. The depth of the groove 11 is such that the nuts of the bolts 16 and 17 will be substantially below the surface of the bar 10, thereby permitting other units slidably secured on the top of the bar to be slid backwardly and forwardly without interference from these bolts. Likewise, the forks may be slid backwardly and forwardly when the bolts are loosened without interfering with the other units of the skate positioned above the bar 10. The forks and wheels just described may be considered as of standard structure and are used on my skate in various positions when desired. In Fig. 1, I show one such fork positioned near the forward end of the bar 10 and one fork positioned near the rear end of the bar 10.

Figure 36:
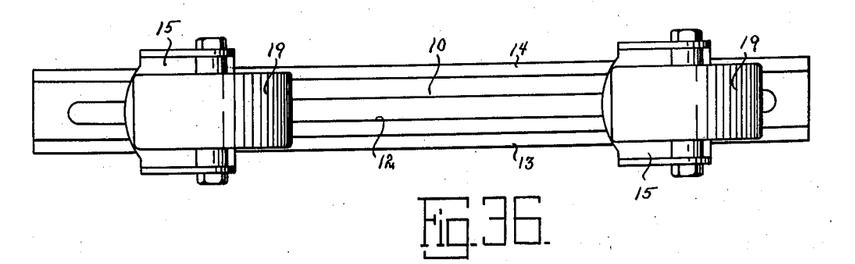
Fig. 36 is a bottom plan view of the chassis showing it with two wheels mounted thereon and in line with each other.

Hereinafter, variations in construction, assembly and operations of forks and wheels will be described. In some instances, the user will wish to assemble the skate so that there will be only one wheel at the forward end of the chassis bar and one wheel at the rear end of the chassis bar as shown in Fig. 36. The wheels may be of any desired width and also the forks may be of any spread to accommodate the wheels. In Fig. 36, I show wheels of greater thickness than in Fig. 3 and therefore, the forks have a wider spread. I have designated the wheels shown in Fig. 36 by the numeral 19.

Figure 32:
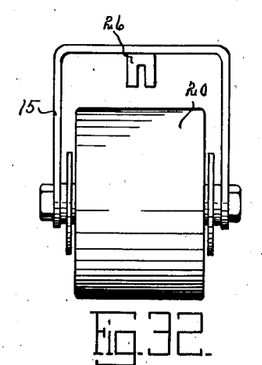
Fig. 32 is an enlarged end view of the wheel hanger used with a wider width wheel than that shown in Fig. 1.
Figure 33:
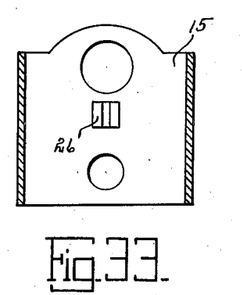
Fig. 33 is an enlarged bottom sectional view of the hanger shown in Fig. 32.

In Fig. 32, a wheel with a still greater thickness is shown and I have designated this particular wheel by the numeral 20'. The numeral 20 designates any type of washer that may be used between the nuts of the bolts 16 and 17 and the inside bottom of the channel groove 11.

Figure 10:
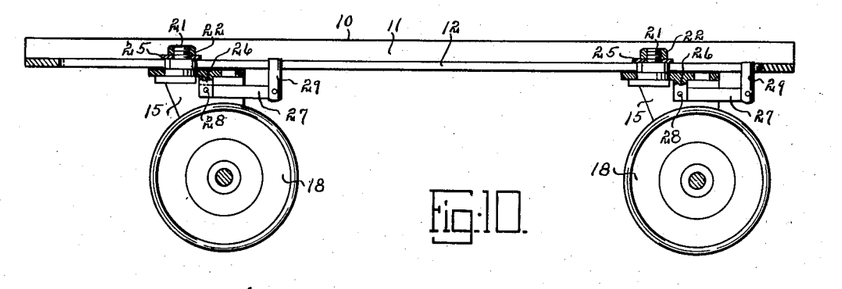
Fig. 10 is a side sectional view of the chassis bar with two wheels pivotally attached thereto and showing a method for yieldingly centering the wheels.
Figure 11:
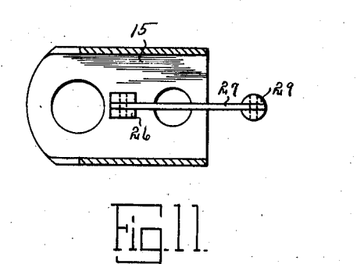
Fig. 11 is an enlarged bottom plan view of one of the wheel supporting brackets and centering springs.
Figure 12:
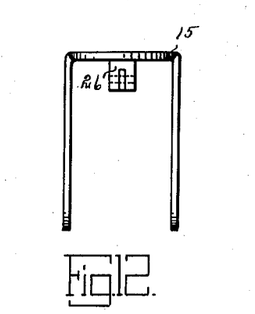
Fig. 12 is an enlarged front plan view of the wheel bracket shown in Fig. 11.
Figure 13:
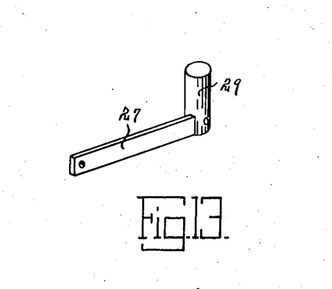
Fig. 13 is an enlarged perspective view of a portion of the centering spring assembly.
Figure 14:
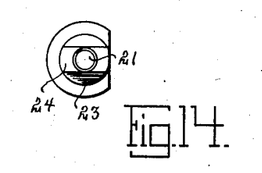
Fig. 14 is an enlarged top plan view of one of the bearing and holding bolts for securing the wheel hanger to the chassis frame.
Figure 15:
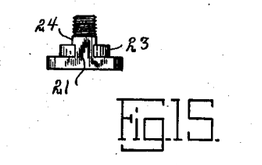
Fig. 15 is an enlarged end plan view of the bearing and holding lugs shown in Fig. 14.
Figure 16:
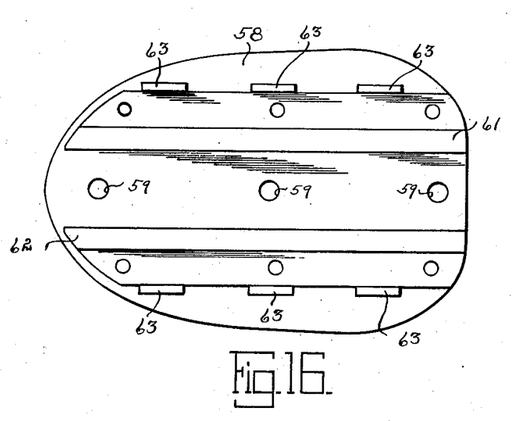
Fig. 16 is an enlarged bottom plan view of the toe plate of my skate with the guide track attached.

Various methods may be employed to secure the forks 15 to the chassis bar and in Figs. 10 I show a method of securing the wheel forks to the chassis bar in such manner that the fork may have limited rotation relative to the chassis bar. I accomplish this by the use of a single bolt 21. The numeral 22 designates the nut of the bolt 21. This bolt 21 extends through one of the holes in the top of the flat topped fork 15 and through the slot opening 12 in the same manner as the bolts 16 and 17. It differs, however, from the previously described bolts in that it has just above its head, a disk or washer portion 23. This portion 23 rotatably engages the hole in the top of the fork 15 and has a heighth slightly greater than that of the thickness of the fork 15. By this arrangement, when the nut 22 is tightened, the bolt will be rigidly secured to the chassis bar 10 but will not bind the fork 15 to the chassis bar, but instead, will permit the rotation of the fork on the secured bolt 21. A shoulder portion 24 is provided on the bolt 21 just above the portion 23. This shoulder 24 is elongated and rests in the slot opening 12 as shown in Fig. 10. This prevents a rotation of the bolt relative to the chassis bar. The numeral 25 designates a washer that may be used between the nut 22 and the upper surface of the bolt of the groove 11. The numeral 26 designates a split lug rigidly secured on the inside top of the fork 15 and longitudinally of the top of the fork and just to the rear or to the front of one of the holes in the fork 15 as shown in Figs. 11 and 12. The numeral 27 designates a horizontal spring arm having one of its ends in the lug 26. This arm is rigidly held in position by a pin 28 or rivet which extends completely through the arm and the lug 26. The numeral 29 designates a finger round in cross-section rigidly secured at its lower end to the free end of the arm 27. When these types of forks are secured to a chassis bar as shown in Fig. 10, these fingers 29 will extend upwardly and engage the slot opening 12. When such a construction is used, the forks 15 and their wheels may turn to the right or to the left relative to the longitudinal axis of the chassis bar, but such turning action relative to the bar will be against the action of the spring arms 27. With the finger 29 of the fork engaging a slot opening 12, the fork and wheel will always be yieldingly held in a direct line with the chassis bar, but the skater can cause the turning of the fork against the action of the spring arm when he desires to do so. When the turning pressure is relieved by the skater, the arm 27 will bring the fork and wheel back to proper alignment with the chassis bar. One, two or more of these limited rotating forks may be used on a single chassis bar. There are times when the user of my skate will not wish this limited rotary movement of the fork and in Fig. 11, I show two holes in the fork. To lock the fork against movement, it is merely necessary to insert an additional bolt through the extra provided hole and the slot opening in the chassis bar.

Figure 2:
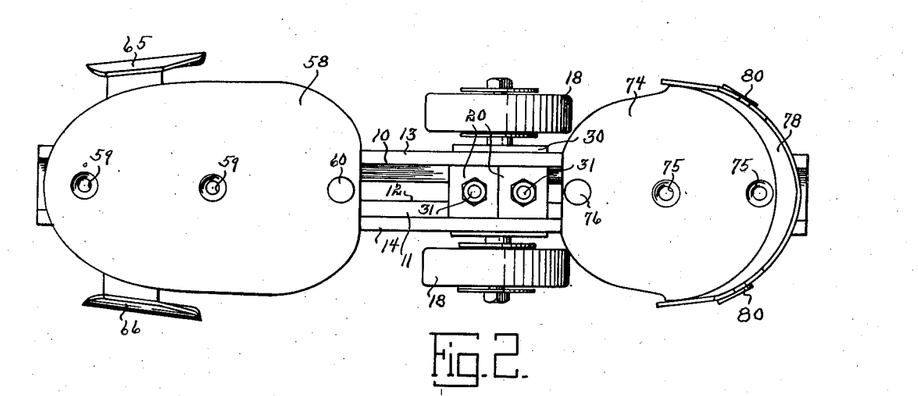
Fig. 2 is a top plan view of my complete skate more fully illustrating its construction.
Figure 21:
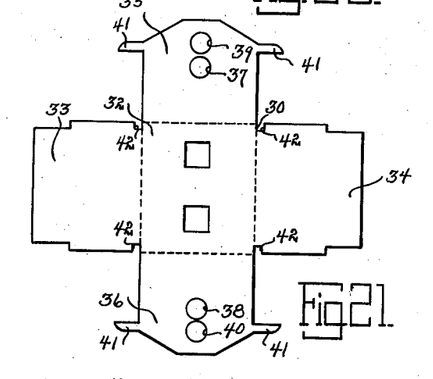
Fig. 21 is an enlarged view of the development of the blank used for making the upper housing of the carriage shown in Fig. 20.
Figure 24:
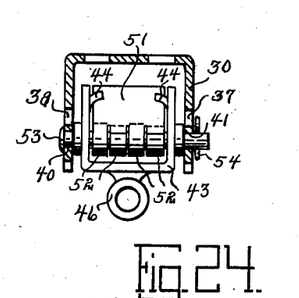
Fig. 24 is an enlarged partial sectional view of the housing and spleen showing the relationship of the parts and more fully illustrating its construction.
Figure 25:
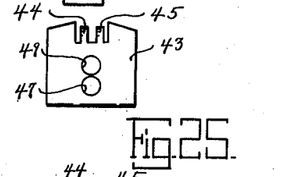
Fig. 25 is an enlarged end view of the spleen member or inside housing shown in Fig. 24.

In most cases, double wheel assemblies will be desired by the user such as shown in Fig. 2. I have used the numeral 30 to designate a rectangular inverted cup housing which may be considered to have a function similar to the fork 15. This housing 30 is secured to the under side of the chassis bar by bolts 31 extending through the top of the housing 30 and through the slot opening 12 of the chassis bar. This housing 30 is stamped from a single sheet of material as shown in Fig. 21. The numeral 32 designates the rectangular central portion which eventually becomes the top of the housing 30 and the numerals 33 and 34 designate the two sides of the housing. The numerals 35 and 36 designate the two end portions of the housing. The numeral 37 designates a hole in the portion 35 and the numeral 38 designates a hole in the portion 36. The numeral 39 designates a hole directly below the hole 37 and in the portion 35. The numeral 40 designates a hole directly below the hole 38 and in the portion 36. When the housing is formed, these holes assume a position as shown in Fig. 24.

Figure 22:
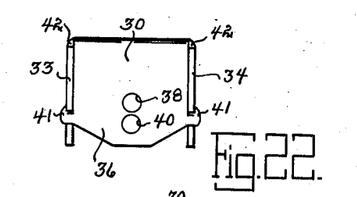
Fig. 22 is an enlarged end view of the upper housing bent to its proper contour.
Figure 23:
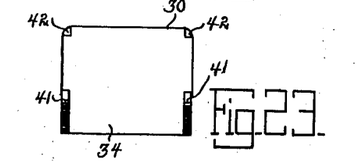
Fig. 23 is an enlarged side view of the upper housing shown in Fig. 22.
Figure 26:
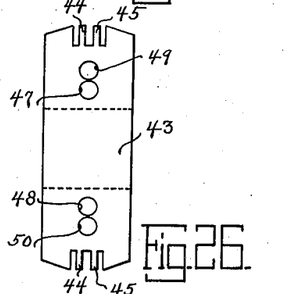
Fig. 26 is an enlarged top plan view of the blank used for forming the housing shown in Fig. 25.
Figure 27:
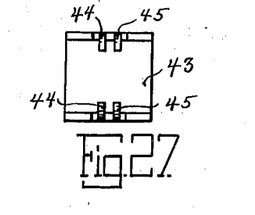
Fig. 27 is an enlarged top plan view of the lower housing more fully illustrating its construction.
Figure 28:
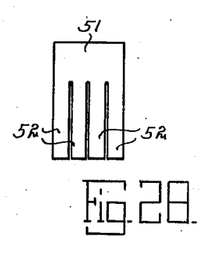
Fig. 28 is an enlarged side plan view of the blank used for centering or forming the spacing spleen of my device.

The numeral 41 designates bendable ears on the two outer corners of the portions 35 and 36. When the housing 30 is formed, these are bent upwardly to engage the side portions 33 and 34 as shown in Fig. 22 and Fig. 23. In order that the housing 30 will have neat top corners, I provided notches 42 in the portions 33 and 34 as shown in Fig. 21. The numeral 43 designates a U-member bent from comparatively wide sheet material as shown in Fig. 26. The numerals 44 and 45 designate two bendable fingers formed in each end of the member 43. This U-member normally loosely rests in a substantially extending position in the housing 30 as shown in Fig. 24. The numeral 46 designates a bearing member, rigidly secured by any suitable means to the bottom of the U-member and extending transversely of the chassis bar. When the U-member is in the housing 30, its two sides will be spaced apart from but adjacent the portions 35 and 36.

Figure 20:
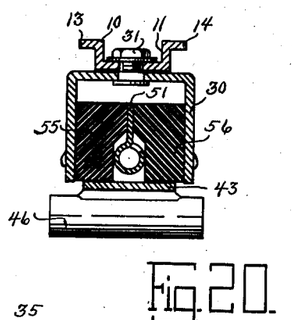
Fig. 20 is an enlarged end sectional view of the resilient hanger or carriage used with the double wheels of my device.

The numerals 47 and 48 designate two holes in the two sides of the U-member 43 respectively. The numerals 49 and 50 also designate two holes in the two side portions of the U-member 43 respectively, but these holes are positioned above the holes 47 and 48. The numeral 51 designates a spleen plate having fingers 52. These fingers 52 are bent into circles to provide a bearing as shown in Fig. 20. The member 51 normally rests within the U-member 43 in substantially a vertical position. It is held in such position by the claw members 44 bent inwardly to engage one of its sides and the claw members 45 also bent inwardly to engage the other side of the member 51 as shown in the drawings. By this arrangement of parts, the member 51 may be lowered or raised within the U-member 43 but is held at its upper end from lateral movement relative to the U-member 43. The numeral 53 designates a pin or axle capable of selectively extending through the holes 38, 40, 37 and 41 in the housing 30, the holes 47, 48, 49 and 50 in the U-member 43 and through the bearing portion of the member 51.

Figure 17:
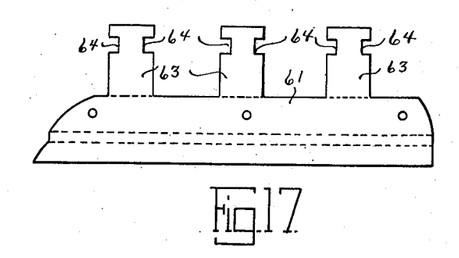
Fig. 17 is an enlarged development of the blank used for forming the engaging lugs and guide track secured to the toe plate.
Figure 18:
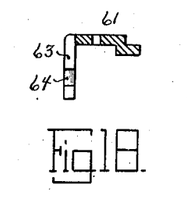
Fig. 18 is an enlarged end sectional view of one of the engaging lug plates after it has been bent.
Figure 29:
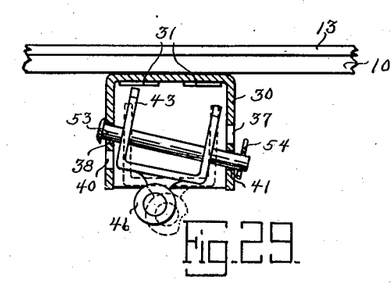
Fig. 29 is an enlarged side sectional view of the carriage showing the various attitudes in which it may be positioned.
Figure 30:
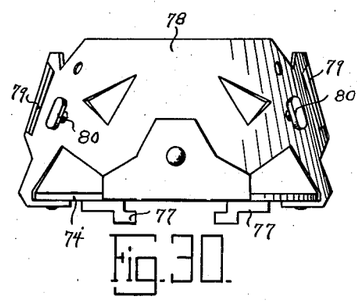
Fig. 30 is an enlarged rear end view of the heel plate and socket member of my device.
Figure 31:
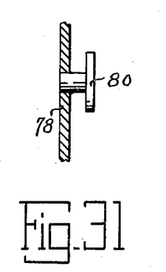
Fig. 31 is an enlarged end sectional view of a portion of the heel socket showing the strap engaging button.

By this construction, the U-member 43 may be rotatably secured in a variety of positions relative to and on the housing 30. By selecting the holes through which the member 53 extends, the bearing 46 may be lowered or raised or slightly moved to left or right as shown in Fig. 29. The numeral 54 designates a cotter key or like extending through the forward end of the pin 53. The numeral 55 designates a block of resilient material such as rubber or like inside the housing 30 and at one side of the member 51. The numeral 56 designates a similar block of resilient material inside the housing 30 and at the other side of the member 51 as shown in Fig. 20. These blocks of resilient material yieldingly hold the member 51 in a vertical position which in turn, yieldingly holds the U-member 43 in a vertical position and the hub 46 in a horizontal position. The numeral 57 designates an axle extending through the hub bearing 46 for rotatably holding the wheel 18 at each side of the member 46. One of the preferred assemblies of my skate is shown in Fig. 1, wherein a single wheel is positioned near the forward end, a single wheel near the rear end, and a double wheel between the two single wheels. By adjusting the position of the pin 53 through the housing 30 and U-member 43, the double wheels may be lowered or raised relative to the two single wheels, or if desired, the double wheels may be positioned in the same plane as the single wheels. The numeral 58 designates the toe plate or platform having three spaced apart holes 59 along its longitudinal center. The numeral 60 designates a bolt selectively extending through either of the holes 59 and through the slot opening 12 as shown in Fig. 19 for rigidly securing the plate 58 against sliding movement on the upper surface of the chassis bar. The numeral 61 designates an elongated flange secured by suitable means to the bottom of the platform 58 and which extends downwardly and then inwardly to embrace and engage the flange edge 13 of the chassis bar. A similar member 62 is secured to the under side of the platform 58 for embracing and engaging the flange 14 of the chassis bar. With the bolt 60 loosened, the platform 58 may be moved forwardly or backwardly on the chassis bar. On each of the members 61 and 62 are three spaced apart downwardly extending lugs 63. Each of these lugs 63 have two directly opposed notches 64. The structure of the members 61 and 63 before being bent and formed, is shown in Fig. 17.

Figure 3:
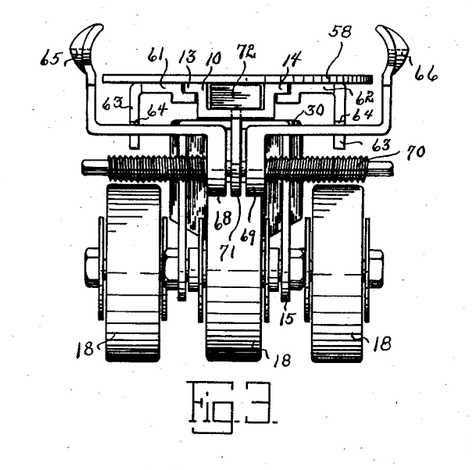
Fig. 3 is an enlarged front plan view of the skate shown in Fig. 1.
Figure 4:
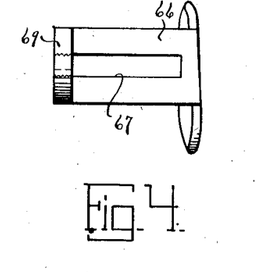
Fig. 4 is an enlarged bottom plan view of one of the shoe sole engaging lugs.

The numerals 65 and 66 designate the two toe clamps, each having a slot 67 for selectively engaging the notches 64 of any one of the lugs 63. By this arrangement, the toe clamps 65 and 66 may be moved forwardly or backwardly as desired on the platform 58. Each of the toe clamps 65 and 66 have their inner ends extending downwardly to form projections 68 and 69 as shown in Fig. 3. The numeral 70 designates a rod threaded through the portions 68 and 69. The threads of the rod 70 that engage the member 69, extend in an opposite direction from the threads of the rod that engage the member 68. By this construction when the rod 70 is rotated in one direction, the toe clamps 65 and 66 will either be moved away from each other or toward each other. The rod 70 has its two end portions squared in cross-section to receive the ordinary key wrench. Such a key wrench has one end to fit the ends of the rod 70 and its other end in the form of a socket wrench to fit all of the other nuts on the skate.

To remove the toe clamps, it is merely necessary to rotate the rod until the toe clamps are free of the threads of the rod 70 and then rotate the toe clamps to positions at a right angle to their original positions at which time, they will drop downwardly free from their supporting lugs 63. The numeral 71 designates an equalizing bar having a rectangular head 72 for slidable engagement with the groove 11 of the chassis bar. This member 71 is rigidly secured to the chassis bar by bolt 73. The member 71 is slotted at its lower end and this slotted portion engages a peripheral groove in the center of the length of the rod 70 as shown in Fig. 3. By this arrangement, the rod 70 is held against sliding movement and the toe clamps will always be equal distance from the sides of the toe platform.

The numeral 74 designates the heel platform having a plurality of spaced apart holes 75 along its center length. This platform 74 is rigidly secured when desired, to the chassis bar by bolt 76 selectively passing through one of the holes 75 and through a slot opening 12 of the chassis bar. The numeral 77 designates two spaced apart flanges secured to the bottom of the heel platform by any suitable means for embracing and slidably engaging the flanges 13 and 14 of the chassis bar. These members 77 serve the same purpose for the heel platform that the members 61 and 62 serve for the toe platform 58. Obviously, when the bolt 76 is loosened, the heel platform may be moved forwardly or backwardly on the chassis bar. When the desired position of the heel platform and toe platform are had the bolts 60 and 73 and 76 should be tightened. The numeral 78 designates a circular guard stop on the rear end portion of the heel platform 74. This guard 78 has two strap slot openings 79. These openings 79 are positioned at each side in the member 78 and extend at an angle to the vertical. The numeral 80 designates an elongated lug botton rigidly secured to the member 78 directly back of each of the strap slot openings 79. The numeral 81 designates a skate strap having slit openings 82 for selectively engaging the lug buttons 80. By the removal of the bolts 60, 73, and 76, the complete toe platform assembly and complete heel platform assembly may be slid to any position on the chassis bar, or completely removed from the chassis bar without interfering with or requiring the removal or displacement of any of the wheel assemblies on the chassis bar. The wheel assemblies may be easily and quickly removed or replaced in various combinations such as illustrated in the drawings.

Figure 5:
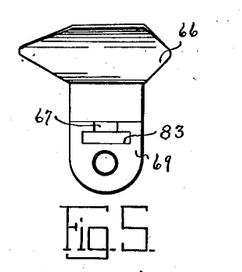
Fig. 5 is an enlarged end view of one of the shoe sole engaging lugs.
Figure 6:
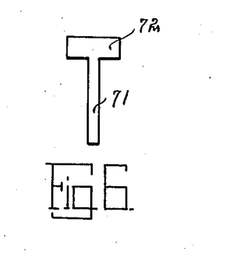
Fig. 6 is an enlarged end plan view of the equidistant lug.
Figure 7:
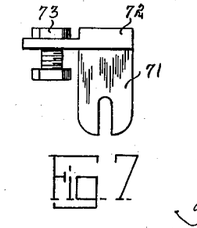
Fig. 7 is an enlarged side view of the equidistant lug more fully illustrating Fig. 6.

If desired, a slot opening 83 may be provided in each of the members 68 and 69 as shown in Fig. 5, to permit the removal of the members 65 and 66 by with-drawing them directly outwardly and free from the member 63.

Figures 37, 38:
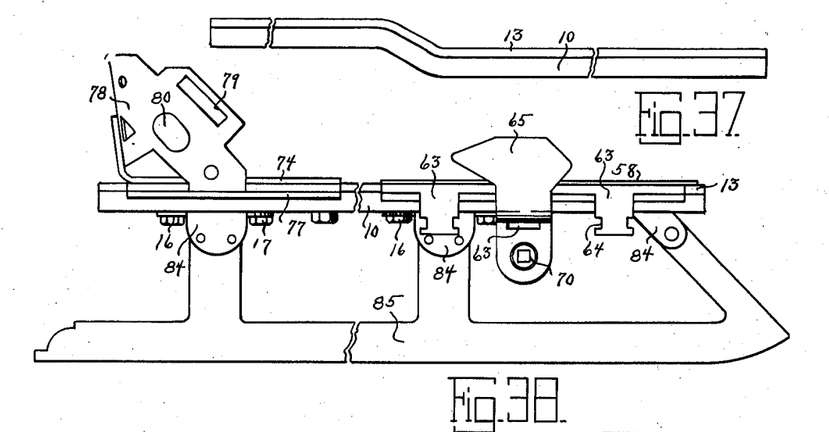
Fig. 37 is a side plan view of a modified form of a chassis having thereon, a raised portion upon which the heel plate of the skate may be attached.
Fig. 38 is a side plan view of my device with an ice runner secured to the chassis in place of wheels.
Figures 39, 40:
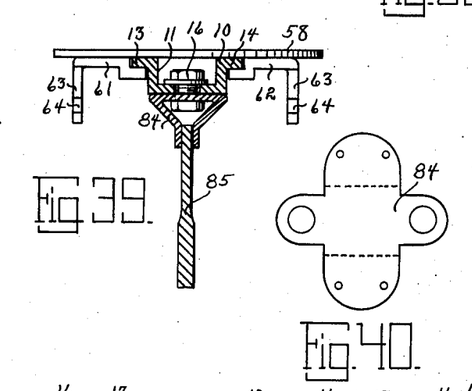
Fig. 39 is an enlarged end sectional view of the chassis bar and one of the blade holding hangers of Fig. 38.
Fig. 40 is an enlarged plan view of the blank used for securing the runner of the ice skate to the chassis bar.
Figure 41:
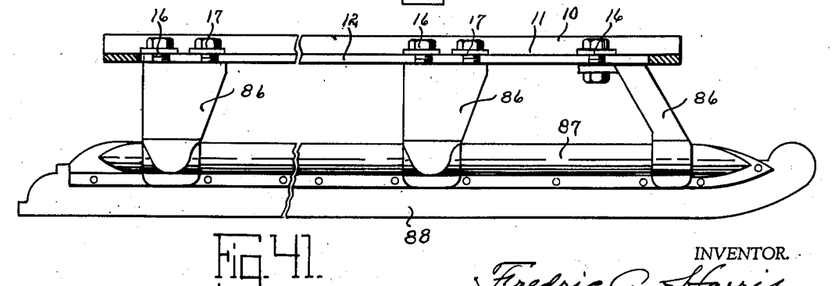
Fig. 41 is a side sectional view of the chassis bar with a tubular type of ice runner assembly secured thereto.
Figure 42:
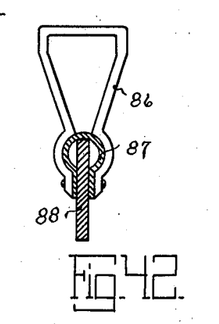
Fig. 42 is an enlarged end sectional view of one of the runners and hangers shown in Fig. 41.

When it is desired to use a blade runner for ice skating, it is merely necessary to remove the wheel assemblies and slide the blade runners on to the chassis bar. The numeral 84 designates the forks which are secured against movement on the chassis bar by the usual bolts 16 and 17. These forks 84 are secured to the skate runner blade 85 as shown in Fig. 38 and Fig. 39. In Figs. 41 and 42, I show the use of the tubular type ice skate. In these figures, I have designated the fork portions by the numeral 86, the tube portion of the skate by the numeral 87 and the runner by the numeral 88.

As is well known, the member 87 is rigidly secured to the member 88. The forks 86 are secured by any suitable means to the member 87. The forks 86 are secured to the chassis bar by the usual bolts 16 and 17.

From the foregoing, it will readily be seen that I have provided a universally adjustable skate which may be easily and quickly changed to meet any requirement, one that may be easily and quickly adjusted to fit different shoes and one that may be easily and quickly changed from ice to pavement or like use. In some instances, a skate may be desired having a raised heel portion or heel lift and when this is the case, the chassis bar may be bent as shown in Fig. 37. Inserts or other fill-ins may be used inside the member 78 to fit different sizes of shoe heels.

Figure 34:
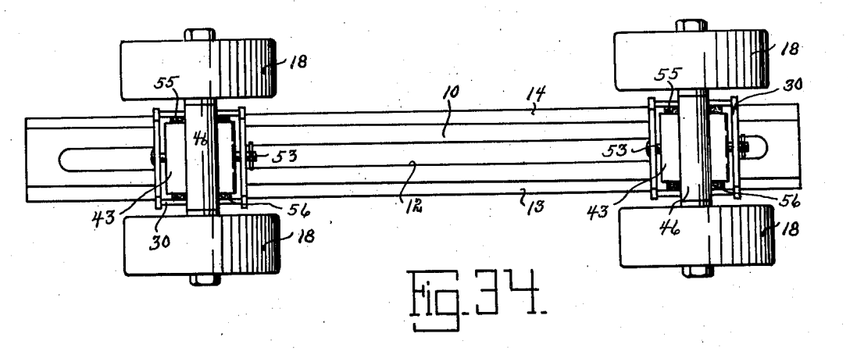
Fig. 34 is a bottom plan view of the chassis with double wheels mounted forward and rear.
Figure 35:
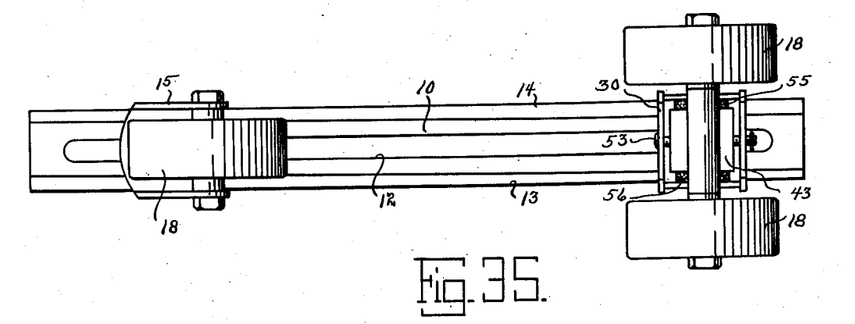
Fig. 35 is a bottom plan view of the chassis showing an alternate wheel arrangement with one wheel at the front and two wheels at the rear.

When a skate is used having one or more pairs of double wheels such as shown in Figs. 2, 34 and 35, the structure of the various unit parts with the resilient material 55 and 56 is of great advantage, inasmuch as a progressive resiliency is obtained for bringing the shaft 57 and skate platforms back to normal relative positions. Obviously, the skater can rotate the skate platform laterally in either direction with the wheels remaining in contact with the supporting surface but when the pressure is released by the skater, all parts will return to their normal positions by virtue of the resilient pressure of either the members 55 or 56 on the member 51. Another advantage of my skate is its adjustability as to the location of the shoe clamps 65 and 66 relative to the platform 58. By providing three pairs of spaced apart supporting lugs 63, three different positions may be selectively had. This makes possible the forwardly or rearwardly selective adjustable positioning of the shoe clamps and these adjustments are readily available to the skate operator.

Some changes may be made in the construction and arrangement of my improved adjustable skate without departing from the real spirit and purpose of my invention, and it is my intention to cover by my claims any modified forms of structure or use of mechanical equivalents which may be reasonably included within their scope.

I claim:

1. In a skate, an elongated chassis bar having an elongated longitudinal groove and an elongated slot opening in the center bottom of said elongated groove, a plurality of supporting elements, bolts extending through said supporting elements and said elongated slot opening for securing the same to the under side of said chassis bar; said bolts having their upper portions resting in said elongated groove and terminating below the upper surface of said chassis bar, wheels rotatably mounted on said supporting elements, foot supporting platforms, and bolts extending through said foot platforms and said elongated slot opening for securing said foot platforms to the upper side of said chassis bar.

2. In a skate, an elongated chassis bar having an elongated longitudinal groove and an elongated slot opening in the center bottom of said elongated groove, a plurality of supporting elements, bolts extending through said supporting elements and said elongated slot opening for securing the same to the under side of said chassis bar; said bolts having their upper portions resting in said elongated groove and terminating below the upper surface of said chassis bar, wheels rotatably mounted on said supporting elements, foot platforms slidably mounted on the upper surface of said chassis bar, and bolts extending through said foot platforms and said elongated slot opening.

3. In a device of the class described, a chassis bar, two fork members slidably adjustably mounted on the bottom of said chassis bar, a wheel rotatably secured to each of said fork members, a supporting member slidably adjustably mounted on the bottom of said chassis bar and two wheels rotatably operatively secured to said supporting member, and a means for securing said chassis bar to the foot of the user.

4. In a device of the class described, a chassis bar, two fork members slidably adjustably mounted on the bottom of said chassis bar, a wheel rotatably secured to each of said fork members, a supporting member slidably adjustably mounted on the bottom of said chassis bar and two wheels rotatably operatively secured to said supporting member, a means for lowering and raising said two wheels relative to said chassis bar, and a means for securing said chassis bar to the foot of the user.

FREDRIC A. HARRIS.